Oct. 18, 1955  D. W. GARBELLANO ET AL  2,721,274
RADIOACTIVITY DETECTOR
Filed July 7, 1952  2 Sheets-Sheet 1
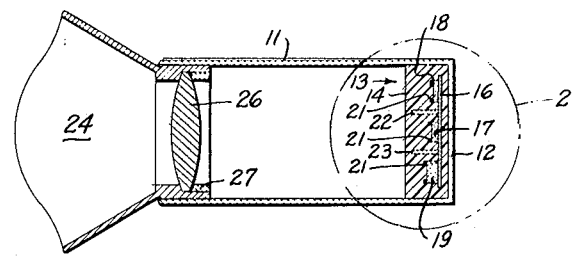
FIG_1_
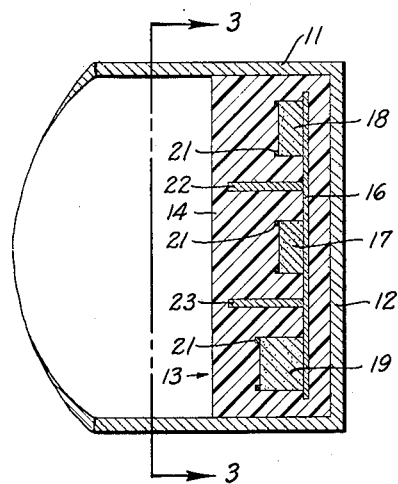
FIG_2_
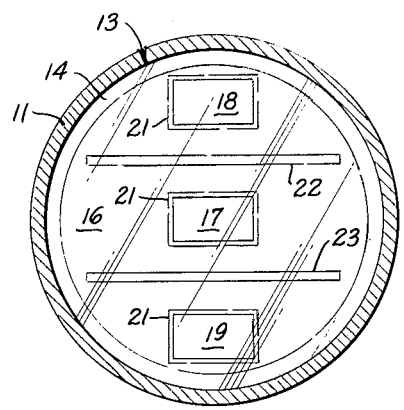
FIG_3_
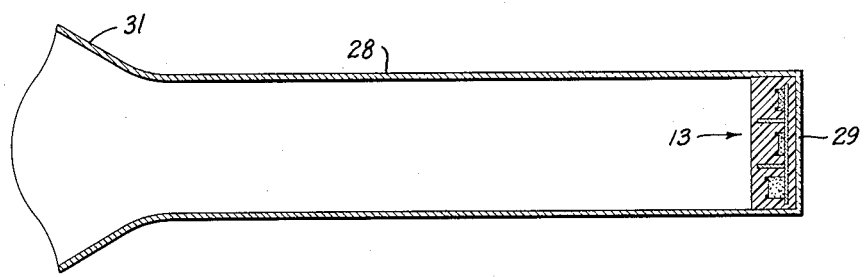
FIG_4_
INVENTORS
David W. Garbellano
Donald R. Cone
BY
Raymond P. Wallace
ATTORNEY

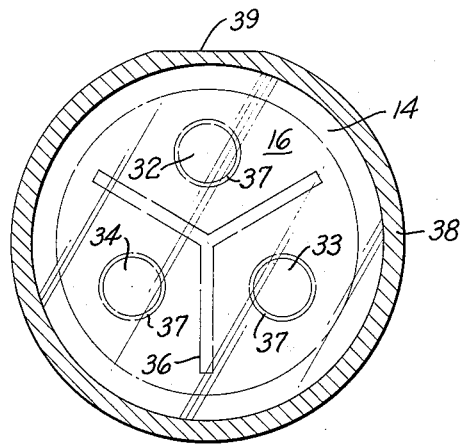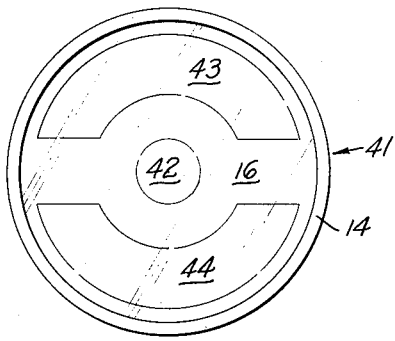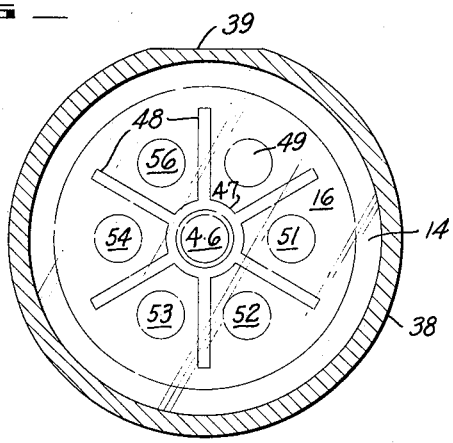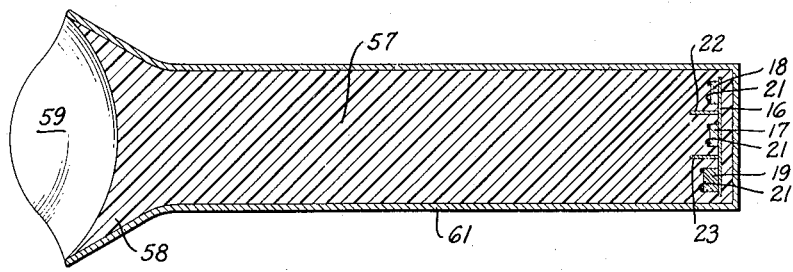

United States Patent Office 2,721,274
Patented Oct. 18, 1955

2,721,274

RADIOACTIVITY DETECTOR

David W. Garbellano, Berkeley, and Donald R. Cone, Oakland, Calif.

Application July 7, 1952, Serial No. 297,546

12 Claims. (Cl. 250—77)

This invention relates to radioactivity detecting devices, and more particularly to a pocket-size device for determining the relative activity level within, or adjament to, a particular area.

There has long existed the need for a simple, reliable, inexpensive device for detecting gamma and beta radiation, suitable for the use of workers whose duties may expose them to such radiation or require them to enter areas where an unknown, but possibly dangerous, level of such radiation may be present. With the recent advent of atomic warfare, and the possibility of radiological warfare, the need for such a device becomes both more urgent and more nearly universal. In an area which has suffered an atomic blast, or contamination from radiological warfare, it will be necessary for rescue workers or military personnel to know the extent and intensity of such contamination. Since such radiation may have extremely serious or fatal effects upon personnel exposed to it, without itself being detectable by any of the physical senses, it is necessary to provide instruments adapted to detect and indicate the intensity of this radiation.

The present invention therefore provides a device which will detect ionizing radiation and afford a rough quantitative measure or indication of the intensity thereof, of sufficient sensitivity and simplicity to enable the novice to judge the degree of danger within a contaminated area. The instrument has the additional advantages of being inexpensive to produce, compact, rugged, long-lived, and stable within a considerable range of temperature, moisture, and handling, and it requires no batteries, electronic meters, tubes, or other complex, expensive, or delicate apparatus.

Accordingly, it is a primary object of this invention to provide a simple and inexpensive instrument capable of detecting and differentiating levels of radiation.

It is a further object of the present invention to provide a device of the character described which is readily usable by an operator with a very minimum of training and technical knowledge.

Another object is the provision of such a detector in which the sensitive elements are protected from moisture.

A still further object is the provision of such a device adapted to cheap mass production.

Yet another object of this invention is to provide a detector adapted to rapid visual indication of the level of radioactivity by comparison of a radiation-activated luminescence with a standard luminescent material of known luminosity.

Other objects and advantages of the present invention will become apparent from the following detailed description of the instrument with reference to the accompanying drawing, of which Fig. 1 is a longitudinal cross-section of a preferred embodiment of the device;

Fig. 2 is an enlarged view of the subject matter within circle 2 of Fig. 1;

Fig. 3 is a cross-section taken on line 3—3 of Fig. 2;

Fig. 4 is a longitudinal cross-section of a second embodiment of the invention;

Fig. 5 is a sectional view similar to Fig. 3, showing a third embodiment of the instrument;

Fig. 6 is a plan view of a plastic sensory matrix which may be used in place of that shown in Figs. 1–3;

Fig. 7 is a sectional view similar to Fig. 3 showing another form of the invention; and Fig. 8 is a longitudinal cross-section of still another embodiment of the instrument.

Referring more particularly to Fig. 1, there is shown an outer generally cylindrical barrel 11 formed of a material opaque to the visible wavelengths of light, such as plastic, metal, or the like, and having one end closed by an opaque closure section 12, which may be continuous with the barrel as shown and of the same material, or may be a separate part adapted to close the barrel by attachment to the end by means of threads, press-fitting, or other conventional means. Closure 12 is formed of an opaque material which is relatively permeable to ionizing radiation such as beta or gamma; examples of such material are plastics, paper products, thin aluminum, and various others. A sensory matrix 13 is positioned within the barrel adjacent to the closed end, and is retained in position by an adhesive, press-fitting, or other suitable means.

This matrix (better shown in Figs. 2 and 3) comprises a block 14 of plastic or other transparent waterproof material, having embedded therein a reflector sheet 16 of material of high albedo, such as white paper, metal foil, polished metal plate, or the like; positioned substantially centrally on the reflector is a crystal or other deposit of phosphorescent material 17 having an inherent luminescence of known or standard intensity. Such phosphor standard may be any desired self-excited material, but it has been found particularly satisfactory in the present application to use the radium-activated dye known under the trade name of Undark Vivid Green No. 80M, which is not appreciably activated by externally produced ionizing radiation of the intensities to be ascertained. Affixed to the reflector at one side of standard 17 is a first relatively thick scintillation crystal 19, and affixed to the reflector at the opposite side of the standard is a second thinner scintillation crystal 18.

Crystals 18 and 19, shown here as rectangular in form, may be any of a variety of materials adapted to emit visible light when subjected to ionizing radiation, such as zinc sulfide, anthracene, thallium-activated sodium iodide, or the like. Calcium tungstate and cadmium tungstate have been found to be particularly satisfactory materials for this use, calcium tungstate having greater apparent sensitivity to radiation when its response is indicated by a photomultiplier tube, and cadmium tungstate providing a more optically effective response. It should be understood that the word "crystal" as here used includes not only material having one of the recognized crystal structures, but also any deposit of scintillant or luminescent material in any physical form, such as paste, compacted detritus, or the like.

Disposed on the face of each luminous element, that is, the side opposite the reflecting element, are masking elements 21, comprising narrow frames of opaque material such as paper or foil of convenient size and shape to cover the crystals, and having a relatively large central aperture therein through which the central portions of the crystals are visible from the eyepiece. The function of the masking elements is to mask from the eye the diminished luminescence which may occur toward the edge of each luminous element, thus leaving visible a clearly defined area of maximum luminescence of standard size for each crystal. An opaque partition 22 of cardboard or other suitable material projecting inwardly from the reflector and substantially normal thereto is disposed between the standard and crystal 18, and a second partition 23 also projecting normally inward from the reflector is disposed between the standard and crystal 19; partitions 22 and 23 project inwardly to a distance greater than the thickness of any of the luminous elements, and serve to prevent the standard luminous element and the scintillation elements from illuminating each other.

Returning now to Fig. 1, an eyepiece 24 which may be of rubber having an outer opening of a shape adapted to conform generally to the orbital region of the face is fitted to the end of barrel 11 opposite closure 12 by any suitable conventional means, such as pressing, threads, or adhesive; the inner portion of the eyepiece is provided with a lens 26 of glass or plastic, retained within the eyepiece by retainer ring 27. The function of the lens is to adapt the focal length of a relatively short instrument to the focal length of the eye.

Referring to Fig. 4, there is shown another embodiment of the present invention comprising a radiation detecting and differentiating device of similar but simplified construction, having a barrel 28 provided with a closure section 29 continuous therewith; positioned within the barrel adjacent to the forward surface of closure 29 is a sensory matrix 13 as in the previous embodiment, bearing embedded therein the same luminescent, scintillant, reflecting, masking, and shielding elements. In the form of the invention shown in Fig. 4 barrel 28 is of sufficient length to allow the eye to focus on the luminous elements without the intervention of a lens or other focusing system; hence the eyepiece 31, while conforming generally at its outer end to the orbital region of the face, does not contain the lens included in the previous embodiment, and may be continuous with the barrel as shown, or attachable in the manner previously described.

Fig. 5 shows a view similar to Fig. 3, of an embodiment of the invention in which the luminescent and scintillant elements are spaced substantially 120° apart on the circular reflector 16 embedded in transparent plastic 14, with radial shielding between them. A standard luminescent element 32 has been placed for convenience at the top of the matrix with the instrument held in the viewing position, although it will be understood that any of the positions shown would be equally satisfactory.

A first relatively thick scintillation crystal 33 occupies the first clockwise position 120° from the standard, and a second thinner scintillation crystal 34 occupies the second clockwise position, 240° from the standard; it is naturally equally feasible to proceed in the counter-clockwise direction if this is desired. A trifurcate shielding partition 36 projecting inwardly normal to reflector 16 extends between each two luminous elements, dividing the reflector into substantially 120° sectors isolating each of the luminous elements. Opaque masking elements 37 similar to those previously described are positioned over each luminous element to define a precise area of maximum luminescence. The crystals and masks are here shown to have a circular form in order to indicate that the shape of the luminous elements is not a governing factor; they may have any shape which is desired for reasons of fabrication, area, positioning, etc. The outer barrel 38 of the device shown in this embodiment is provided with an external positioning agent for holding the instrument in the proper viewing position, in this case a flat section 39 at the top thereof. Such a positioning agent provides rapid orientation of the instrument with regard to the standard for use in the dark or for other tactile positioning, and may be a flat section as shown, a dimple or protrusion on the barrel, or any other suitable configuration of the barrel, eyepiece, or barrel closure which is adapted to detection by the tactile sense.

Shown in Fig. 6 is an embodiment of the sensory matrix similar to that shown in previously described figures, but having different configurations of the luminous elements.

A sensory matrix 41 comprises a reflecting element 16 as already described, embedded in transparent waterproof plastic 14; positioned approximately centrally on the reflector is a phosphor 42 of standard intensity having a circular form. A first relatively thick scintillation crystal 43 of arcuate form is positioned above the standard, and a second thinner scintillation crystal 44 of like arcuate form is positioned below the standard; in this embodiment the shielding between luminous elements has been omitted, which may be done with only a minor loss of sensitivity; the masking elements have also been omitted, which renders the instrument cheaper to manufacture, and does not seriously detract from comparison of the luminous bodies.

Referring now to Fig. 7, there is shown an embodiment incorporating features of the embodiments of Figs. 5 and 6. The outer barrel 38 has the same flat section 39 for a positioning agent as in Fig. 5; the standard 46 is here shown positioned at the central point of the matrix and surrounded by a shield having a hollow central hub 47 and a plurality of extensions 48 projecting radially therefrom. In each of the interstices between these shielding extensions is positioned a scintillation crystal, beginning with the thickest, or most sensitive, crystal 49 in the position just right of the top, and proceeding clockwise through progressively less sensitive crystals 51, 52, 53, 54, and 56. It will again be understood that although the clockwise arrangement is convenient and easily grasped, any other desired arrangement may be followed.

Fig. 8 shows a still further embodiment of the present invention, in which a solid, transparent, waterproof plastic body 57 of generally cylindrical configuration has one end formed into an eyepiece 58 of the general shape previously described, with a bow-like hollow 59 or cavity therein to allow for the protrusion of the eye and the movement of the eyelashes. Positioned at the opposite end of the plastic body and encased in the waterproof plastic is an arrangement of such luminescent, scintillant, reflecting, masking, and shielding elements as have already been described, or any combination thereof; for convenience in representation the elements shown in the figure are the same as those of Figure 2. The entire assembly of plastic and sensory and related elements is covered with a sheath 61 opaque to the visible wavelengths of light but permeable to ionizing radiation of the character and energy it is desired to detect; such a sheath may be another layer of plastic, a metal foil, metal plate, paint, or other suitable material. The plastic cylinder of this embodiment also be of special nonsymmetrical form to permit tactile positioning.

Any of the matrices shown in Figs. 3, 5, 6, and 7, or any of the arrangements of sensitive elements shown therein, is suitable for use with any of the embodiments of the invention, whether or not it is desired to have an outer barrel provided with a tactile positioning agent or configuration. It is also possible to use as standard luminescent and scintillant elements materials having a visible difference in wavelength of the light emitted, whereby an additional factor is provided to discriminate between differing levels of radiation. For rapidity and cheapness of manufacture the shielding partitions between luminous elements may be omitted from any embodiment of the invention without serious loss of efficiency. The reflector element behind the crystals may also be omitted with only a moderate sacrifice or brightness.

In operation the instrument is held with the eyepiece firmly pressed to the eye to occlude external light; the other eye may be closed to permit rapid dark adaptation, which usually requires approximately thirty seconds, or occasionally a little longer. In an embodiment having only two scintillant elements, the crystal thicknesses have been chosen such that the thicker or more sensitive crystal would be discernible in a gamma radiation field of a few Roentgens per hour; and at 20 to 30 Roentgens per hour its light output matches that of the standard.

The scintillation crystal continues to grow brighter with increasing radiation until it reaches the range where the second crystal becomes visible. The second crystal is of such thickness that its light output at minimum activation overlaps that of the maximum of the first crystal, and equals that of the standard at about 100 Roentgens per hour. Hence, if only the standard is visible, the level of radiation in the area is not dangerous and may be endured for a considerable period of time. If one scintillant crystal is visible, the radiation field is appreciable and should be endured only for a limited time, as determined by standards based on human physiology and the urgency of the operation to be performed in the contaminated area. If both scintillant crystals are visible the radiation field is high, and if the second crystal should match the standard in brightness the area should be evacuated at once as too dangerous to allow of any useful effort. If an embodiment having more than two scintillant elements is employed, the time of exposure to the radiation field may be more precisely estimated, in accordance with the increased precision of indication of the strength of the radiation field.

The above detailed description is for purposes of illustration, and obviously many modifications and variations of the present invention are possible in the light of the above teachings. It is therefore to be understood that the invention is to be limited only by the scope of the appended claims, and that within such scope the invention may be practiced otherwise than as specifically described.

What is claimed is:

1. A radiation detecting device comprising in combination a light-tight barrel, an eyepiece adjacent to the interior of said barrel, an element of standard inherent luminescence disposed within said barrel and visible from said eyepiece, and disposed adjacent to said standard luminescent element a plurality of elements adapted to glow when exposed to ionizing radiation of external origin.

2. A radiation detecting device as in claim 1, having shield opaque to visible light but transparent to ionizing radiation disposed between said standard luminescent element and said elements adapted to glow under radiation.

3. A radiation detecting device as in claim 1, having a reflector disposed adjacent to said luminescent and said glow elements on the side opposite said eyepiece.

4. A radiation detecting device as in claim 1, having apertured opaque masking elements disposed between said eyepiece and said luminescent and said glow elements and adapted to define a visible area of said luminescent and said glow elements.

5. A radiation detecting device as in claim 1, having opaque shields disposed between said standard luminescent element and said glow elements, and having apertured opaque masking elements disposed between said eyepiece and said glow and said luminescent elements and adapted to define a visible area of said luminescent and said glow elements.

6. A radiation detecting device as in claim 1, having opaque screens disposed between said standard luminescent element and said glow elements, having apertured opaque masking elements disposed between said eyepiece and said luminescent and said glow elements and adapted to define a visible area of said luminescent and said glow elements, and having a reflector disposed adjacent to said standard luminescent element and said glow elements on the side opposite said masking elements.

7. In a radiation detecting device, a sensory matrix comprising in combination a standard inherently luminescent element, at least one scintillation element disposed in substantially the same plane as said standard element, a reflector disposed in a plane parallel thereto and adjacent to said luminescent element and said scintillation element, and a transparent waterproof body surrounding all said elements.

8. In a radiation detecting device, a sensory matrix comprising in combination an element of standard inherent luminescence, at least one scintillation element disposed in substantially the same plane as said standard element, a reflector disposed in a plane parallel thereto and adjacent to said luminescent element and said scintillation element, a first apertured opaque masking element disposed adjacent to said standard element on the side opposite said reflector and adapted to define a visible area of said standard element, a second apertured opaque masking element disposed adjacent to said scintillation element on the side opposite said reflector and adapted to define a visible area of said scintillation element, an opaque shield disposed between said standard element and said scintillation element and substantially normal to the plane occupied by said standard and scintillation elements, and a transparent waterproof body surrounding all said elements.

9. A radiation detecting device as in claim 1, having a lens disposed between said eyepiece and said standard and said plurality of glow elements.

10. A radiation detecting device, comprising in combination a light-tight barrel closed at one end and having the other end formed into an eyepiece, and having disposed within said barrel adjacent to said closed end a sensory matrix comprising a standard inherently luminescent element, at least one scintillation element disposed in substantially the same plane as said standard element, a reflector disposed in a plane parallel thereto and adjacent to said luminescent element and said scintillation element, and a transparent waterproof body surrounding all said sensory matrix elements.

11. In a radiation detecting device, a sensory matrix comprising in combination a standard inherently luminescent element, a first scintillation element having a preselected sensitivity to external ionizing radiation disposed in substantially the same plane as said standard element, a second scintillation element having a different degree of sensitivity to external ionizing radiation from said first scintillation element and disposed in substantially the same plane as said standard and said first scintillation elements, and a transparent waterproof body surrounding all said elements.

12. In a radiation detecting device, the combination comprising a transparent waterproof body of generally cylindrical shape and having one end formed into an eyepiece, said waterproof body having disposed therein at the end opposite said eyepiece a reflector element and an element of standard inherent luminescence and at least one scintillation element adapted to glow when exposed to ionizing radiation of external origin, said standard and said scintillation elements being positioned between said reflector and said eyepiece, and an opaque sheath surrounding said transparent element except at the end opposite said reflector and within said eyepiece.

References Cited in the file of this patent

UNITED STATES PATENTS

| | | |
|---|---|---|
| 894,499 | Hinrichs | July 28, 1908 |
| 2,451,979 | Rosenblum | Oct. 19, 1948 |
| 2,559,219 | Ludeman | July 3, 1951 |
| 2,578,703 | Hopkins et al. | Dec. 18, 1951 |
| 2,616,051 | Daniels | Oct. 28, 1952 |